US011669523B2

(12) United States Patent
Yoldemir et al.

(10) Patent No.: US 11,669,523 B2
(45) Date of Patent: Jun. 6, 2023

(54) QUESTION LIBRARY FOR DATA ANALYTICS INTERFACE

(71) Applicant: Business Objects Software Ltd., Dublin (IE)

(72) Inventors: Ahmet Yoldemir, Vancouver (CA); Alexander MacAulay, Vancouver (CA); Saeed Jahankhani, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 150 days.

(21) Appl. No.: 16/712,760

(22) Filed: Dec. 12, 2019

(65) Prior Publication Data

US 2021/0182291 A1   Jun. 17, 2021

(51) Int. Cl.
*G06F 16/00* (2019.01)
*G06F 16/2452* (2019.01)
*G06F 16/2455* (2019.01)

(52) U.S. Cl.
CPC .. *G06F 16/24522* (2019.01); *G06F 16/24553* (2019.01)

(58) Field of Classification Search
CPC ........ G06F 16/24522; G06F 16/24553; G06F 16/3329
See application file for complete search history.

(56) References Cited

U.S. PATENT DOCUMENTS 9,535,902 B1 * 1/2017 Michalak ............ G06F 16/3331
2019/0065576 A1 * 2/2019 Peng ........................ G06F 16/22

OTHER PUBLICATIONS

Zlhelezniak, et al. Correlation Coefficients and Semantic Textual Similarity, Proceedings of NAACL-HLT May 19, 2019 )pp. 951-962.*
N. Kuchmann-Beauger, F. Brauer and M. Aufaure, "QUASL: A framework for question answering and its Application to business intelligence," IEEE 7th International Conference on Research Challenges in Information Science (RCIS), 2013, pp. 1-12, doi: 10.1109/RCIS.2013.6577686. (Year: 2013).*

(Continued)

*Primary Examiner* — Cheryl Lewis
(74) *Attorney, Agent, or Firm* — Fountainhead Law Group P.C.

(57) ABSTRACT

A question library aids in intuitive analysis of stored data. The question library comprises: 1) a plurality of text questions, 2) a numerical representation (e.g., a vector) of each text question, and 3) a corresponding query in a query language. A numerical vector is generated for a question posed to a database. If a matching library question (based upon vector similarity) is not found, the user receives the original answer. If a matching library question based upon vector similarity is found, the user receives the answer to that library question (with potential modifications). Embodiments may determine similarity by calculating Pearson's coefficient, Spearman's rho, or Kendall's tau. Embodiments may parse the first query to identify constituent elements (measures, dimensions, filters). These entities are extracted and compared to elements of the second question matched within the library, to allow modification of the library query to align with the initial query.

16 Claims, 5 Drawing Sheets

(56) References Cited

OTHER PUBLICATIONS

Cer, et al., "Universal Sentence Encoder for English", Proceedings of 2018 Conference on Empirical Methods in Natural Language Processing, Nov. 4, 2018, 6 pages.
Zhelezniak, et al. Correlation Coefficients and Semantic Textual Similarity, Proceedings of NAACL-HLT 2019, 12 pages.
Bialecki, et al. "Apache Lucene 4", Lucid Imagination website (lucidimagination.com), 8 pages.
"Duckling: the linguist that parses text into structured data", Oct. 29, 2019, 17 pages. Website: https://duckling.wit.ai.

* cited by examiner

| TOPIC | ENTITY | OVER-WRITE? | ID | QUESTION TEXT | EMBEDDING VECTOR | QUERY |
|---|---|---|---|---|---|---|
| Talent | Movement | N | 1a | How many employees have transferred into the sales department this quarter? | [0.98, -0.32, 0.55, ..., -0.01] | SQLite Query language |
| Talent | Movement | N | 1b | How many entry-level employees have transferred out of sales department? | [0.44, -0.92, 0.06, ..., -0.08] | SQLite query language |
| Talent | Movement | N | 1c | Which employees have moved to the European office from elsewhere? | [-0.07, 0.35, 0.55, ..., -0.93] | SQLite Query language |
| Talent | Retention | Y | 2a | Who is at risk of resignation? | [-0.88, 0.07, 0.05, ..., -0.56] | SQLite Query language |
| ... | ... | ... | ... | ... | ... | SQLite Query language |
| Organization | Diversity | N | 4n | How many female managers do we have? | [0.42, 0.67, 0.88, ..., -0.22] | SQLite Query language |

FIG. 3

FIG. 4

QUESTION LIBRARY FOR DATA ANALYTICS INTERFACE

BACKGROUND

Unless otherwise indicated herein, the approaches described in this section are not prior art to the claims in this application and are not admitted to be prior art by inclusion in this section.

Analytics applications permit the interrogation and visualization of highly complex data volumes that are organized into measures, dimensions, tables, data objects, hierarchies, and other artifacts. Typically, queries to such data corpuses may be posed by users in the form of a single natural language question posed ad-hoc.

Even though this approach offers flexibility, such systems may not aid users in structuring of their overall analyses. For example, while an analytics application might return an accurate response to a single query, no follow-up is offered. That is, there is no suggestion to pose additional question(s) that could deepen the meaning of a specific data analysis pathway that is being pursued by the user.

SUMMARY

A question library assists a user in conducting an intuitive analysis pathway for stored data. The question library comprises: 1) a plurality of text questions, 2) a numerical representation (e.g., a vector) of each text question, and 3) a query in a query language corresponding to each text question. A first (e.g., ad-hoc) question is posed to a database. If a matching library question is not found based upon similarity between vectors, the user receives the original answer. If a matching library question based upon vector similarity is found, the user receives the answer to that library question (with potential modifications) instead. In the latter case, a follow-on question may be suggested by the system. The result of the follow-on question is not shown until the user confirms they are indeed interested in a deeper analysis. The user is free to accept this suggestion to see the answer, or pose another ad-hoc question.

Specific embodiments may determine the similarity between posed/library questions, by calculating a correlation coefficient (e.g., Pearson's coefficient, or a non-parametric rank correlation coefficient such as Spearman's rho or Kendall's tau).

Particular embodiments may parse the first query to identify constituent elements—e.g., measures, dimensions, and/or filters. These entities are extracted and compared to elements of the second question matched within the library, to allow modification of the library query to more closely align with the initial query.

The question library may be organized in a hierarchical structure along a certain topic (e.g., lines of business), conforming to typical analysis patterns for that topic. In this manner, the returned library queries may assist the user in further exploration of relevant data stored within the database.

The following detailed description and accompanying drawings provide a better understanding of the nature and advantages of various embodiments.

DETAILED DESCRIPTION

Described herein are methods and apparatuses implementing a question library according to embodiments. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
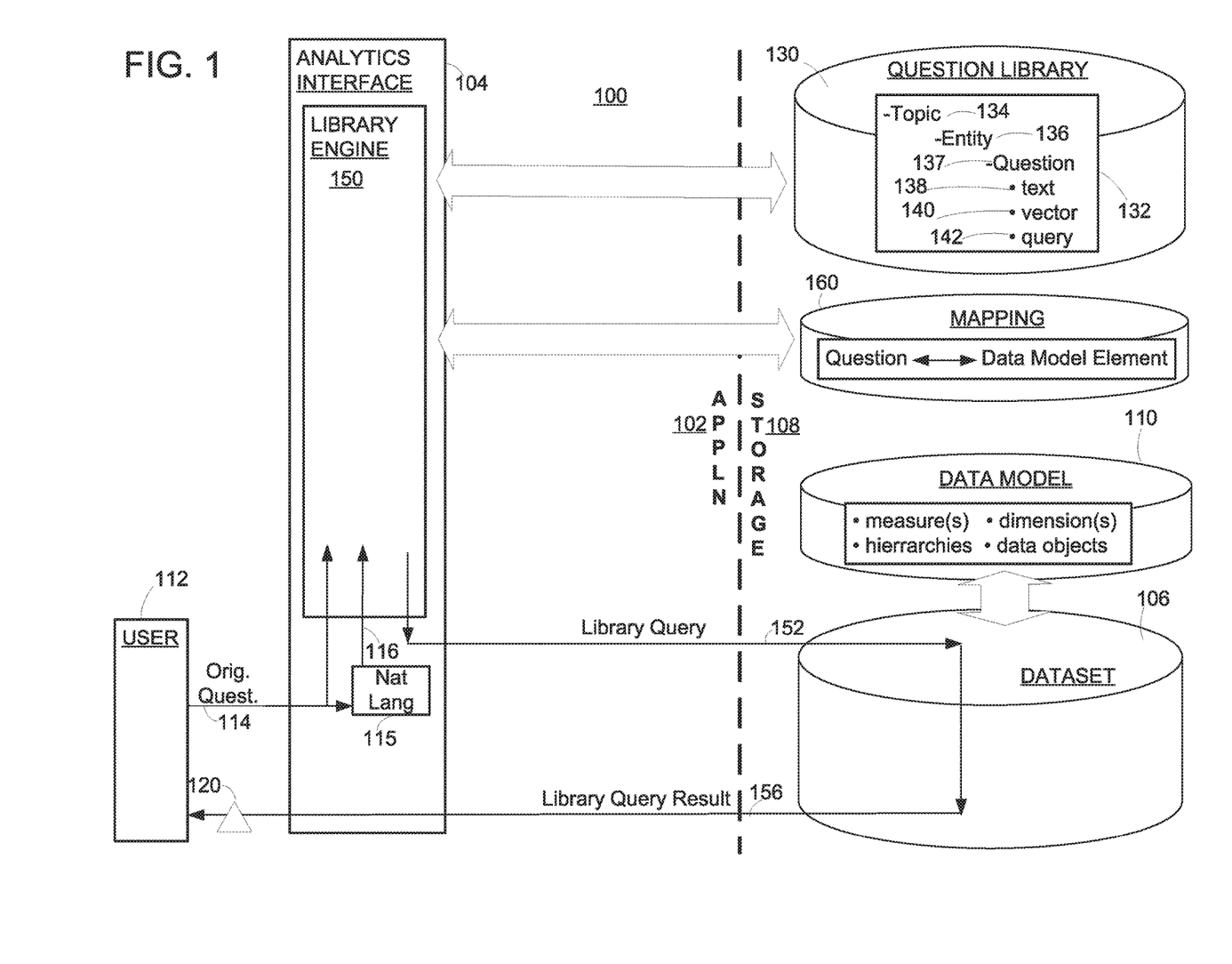
FIG. 1 shows a simplified diagram of a system according to an embodiment.

FIG. 1 shows a simplified view of an example system that is configured to implement a question library according to an embodiment. Specifically, system 100 comprises an application layer 102 comprising an analytics interface 104, that is in communication with a data set 106 located in a storage layer 108.

The data set comprises data organized according to a data model 110. The data model describes the structure of the stored data set in terms of different measures, dimensions, data objects, and/or hierarchies.

The user 112 seeks to interrogate and analyze the data of the data set, in order to achieve insight(s) thereto. Accordingly, the user poses a natural language question 114. That original question is received by the analytics interface, and transformed by natural language recognition component 115 into posed query 116 having a form—e.g., Structured Query Language (SQL)—executable upon the data set.

Moreover, the system according to the embodiment of FIG. 1, further comprises a question library 130 located in the storage layer. The question library comprises a plurality of predetermined questions 137 organized in a hierarchical structure 132, e.g. according to topic 134 and entity 136.

Each question in the library includes a natural language question text 138, an associated numerical representation 140 (e.g., a vector), and a corresponding query 142 in executable form (e.g., SQL). Further details regarding an exemplary question library are provided below in connection with FIG. 3.

The content of the question library is accessed by the library engine 150. In particular, the library engine is configured to receive the original natural language question, and the corresponding posed query in executable form.

In response, the library engine references the question library to perform a comparison between the posed question, and pre-existing questions within the library. As described below, that comparison may involve determining a similarity between numerical representations of the posed question and library questions.

The library engine also references a mapping 160. The mapping represents the linkage between questions of the library, and the various specific structures (measures, dimensions, hierarchies, data objects) of the data model and data set.

Based upon that similarity and the mapping, the library engine then communicates a matching, library-based query 152 to the query interface. In some embodiments, the library-based query may correspond exactly with the query stored in the library with the matching question.

Alternatively, however, the library-based query may represent a modification by the library engine of the query stored in the library. Such modification can involve the addition of, removal of, and/or substitution of query element(s). As discussed in detail below, one example of such modification can involve parsing the originally-posed question to identify filters (e.g., geographic, temporal) relevant thereto.

The query interface receives library-based query from the engine, for execution against the data set. A corresponding query result 156 to the library question, is returned to the user via the analytics interface. That query result may then be formatted by the analytics interface into an appropriate visualization 120 (e.g., raw number, bar chart, etc.) for inspection by the user.

Thus, in response to posing a natural language question to an analytics interface, the user receives a result based upon a similar question from the question library. Similarity between the original question and the library question determined by the engine, ensures that the query result will also be relevant to the user's ongoing data analysis.

Figure 2:
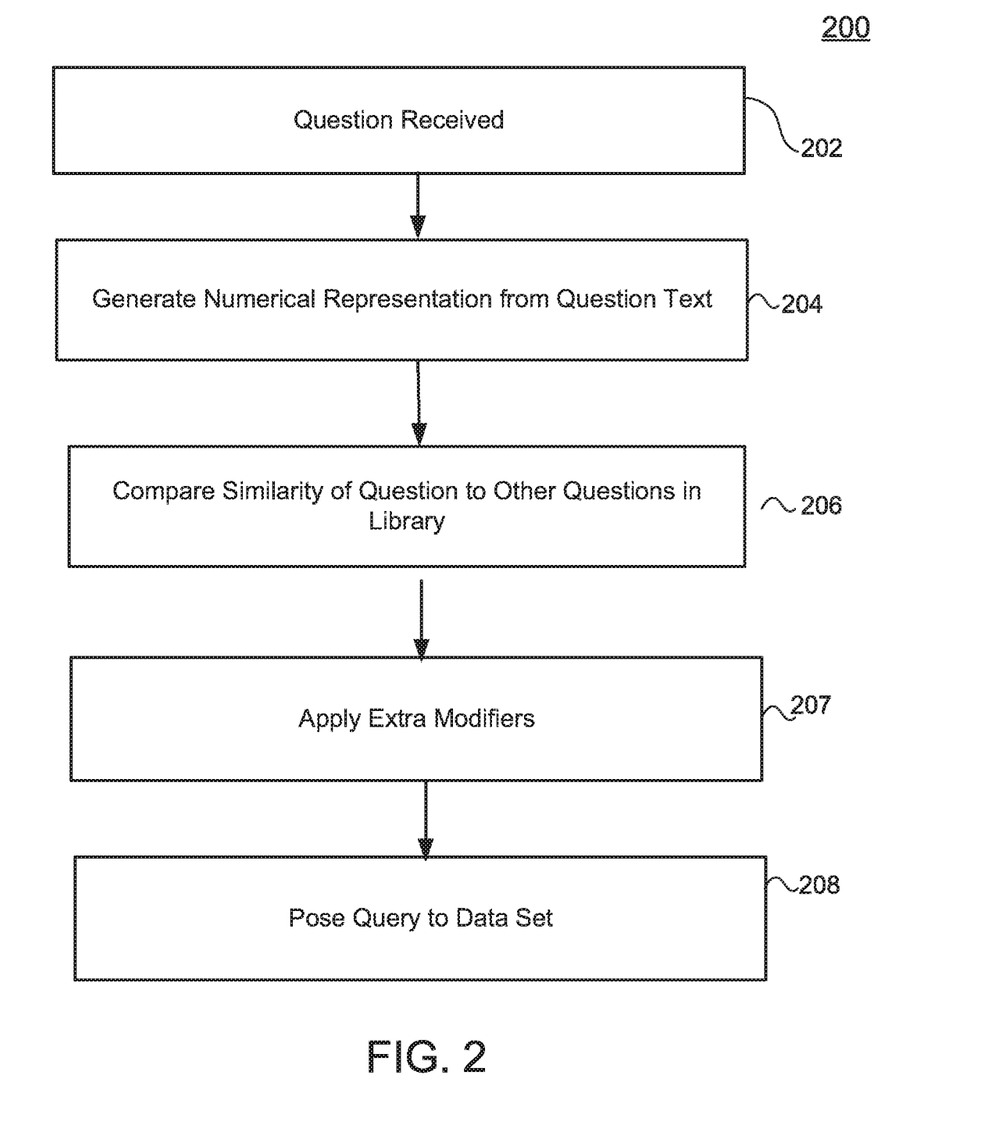
FIG. 2 shows a simplified flow diagram of a method according to an embodiment.

FIG. 2 is a flow diagram showing various actions taken in a method 200 according to an embodiment. At 202, a first natural language question is received.

At 204, the first natural language question is converted into a first numerical representation. That numerical representation may be a vector.

In some embodiments, the natural language question as a whole, may be assigned numerical values for each of the indices. According to other embodiments, numerical values for the indices may be determined for every word of the first natural language question.

At 206, the first numerical representation is compared with a second numerical representation of a second natural language question that is stored in a question library. According to particular embodiments, that comparison may take the form of a similarity metric calculated from a correlation coefficient (e.g., Pearson's coefficient, or a non-parametric rank correlation coefficient such as Spearman's rho or Kendall's tau).

At 208, an executable query stored in the question library associated with the second natural language question, is communicated to the underlying data set. In some embodiments, that executable query may be communicated in a form unchanged from that stored in the question library. According to alternative embodiments, however, as shown in step 207 the executable query may be modified from the stored library query in order to more closely align with the original question.

A query result based upon the executable query, may then be returned to the user. Later on, the original question may be promoted into the library in order to allow any user to obtain an answer to that question by asking a semantically similar question later on.

Details regarding implementation of a question library according to embodiments, are now provided in connection with particular examples involving specific elements available from SAP SE, of Walldorf, Germany.

Example

The SAP Analytics Cloud (SAC) platform offers flexible analytical interrogation of large data volumes stored in a remote database. Moreover, SAC's "Search to Insight" natural language recognition feature allows the user to pose queries in the form of a text question, that is converted into business intelligence artifacts recognized by the database.

Embodiments leverage the insight that within particular topics (e.g., lines of business) user analyses typically conform to repeated patterns. Accordingly, a question library is created with domain knowledge embedded therein, in order to enrich and guide a user's analytic process.

The following describes a workflow for retrieving questions from an existing question library, and augmenting the question with extra modifiers. A goal is to allow a user to answer business intelligence questions more easily through a natural language interface.

In this example, an expert-curated question library is assumed to be available. The question library exhibits a hierarchy structured to answer important questions arising in a certain line of business.

Consider the implementation of a question library in the context of analytics being performed in the Human Resources (HR) domain. The following presents a highly simplified breakdown of the hierarchy of that HR domain.

Organization
Organizational breakdown
Overall key performance indicators
Employee diversity
Others . . .
Talent
Movement
Retention
Compensation
Others . . .
Talent Acquisition
Applicant pipeline
Acquisition sources
Quality of new hires
Others . . .

Within this hierarchical structure, each subcategory could have predefined questions and corresponding database queries to find the answer, together with a user interface to present customization options. These features help guide the user to the answer to their current question, and may also answer other questions of interest to the user.

For example, to answer the HR question:

"Who is at risk of resignation?", the user can navigate to the corresponding subcategory (-Talent>o Retention) within the hierarchy of the question library. There, the user finds the answer to the question, together with relevant supporting information (e.g., factors leading to employee exits, what the company can do to mitigate risk, etc.)

Based upon the structure of the question library hierarchy, it is assumed that the questions in each subcategory conform to a logical progression. For example, this progression may allow users to understand the big picture first, and then to probe deeper into details of the corresponding topic.

Figure 3:
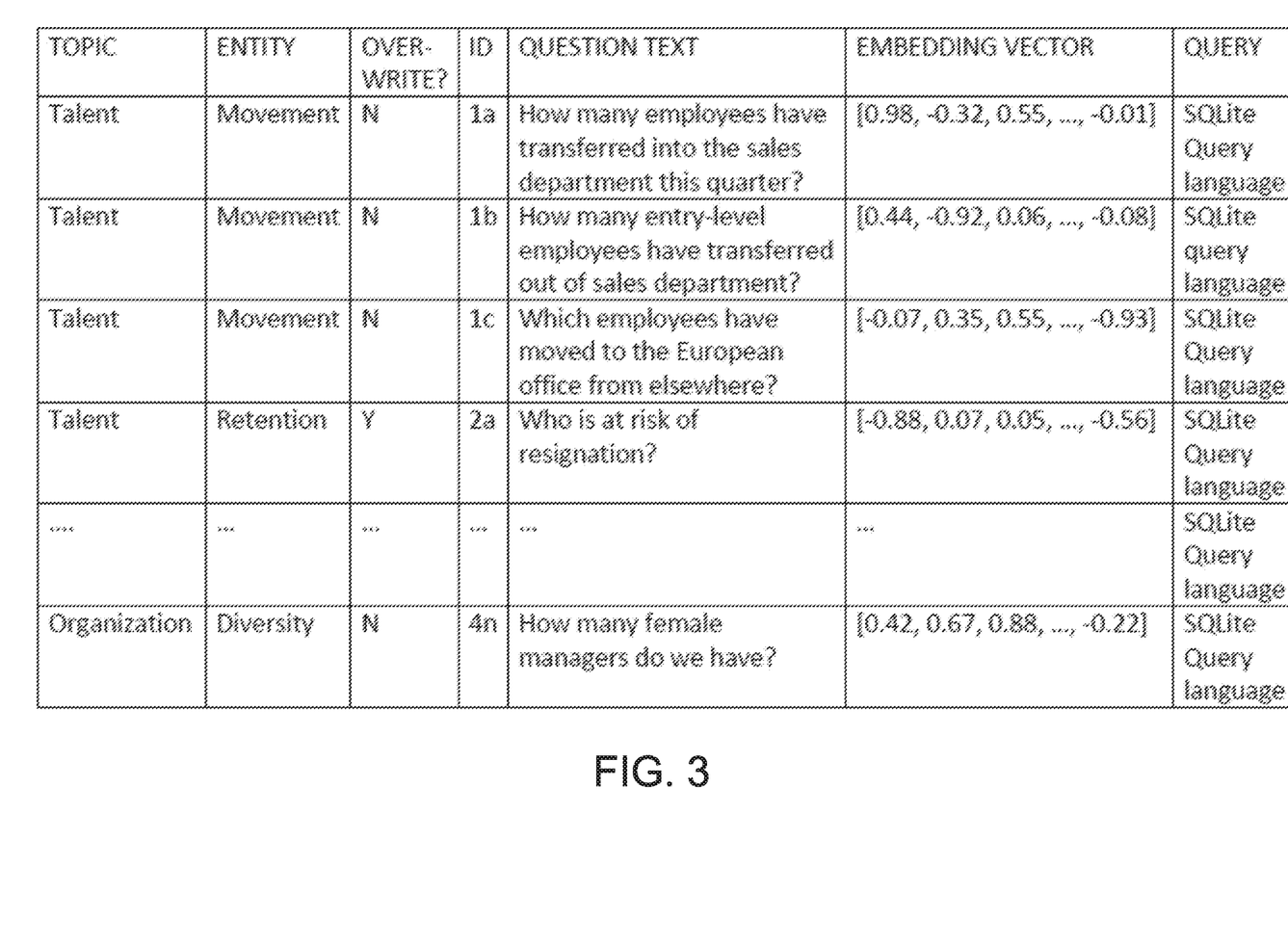
FIG. 3 shows an embodiment of a simplified question library according to an example.

FIG. 3 shows a simplified diagram of a simplified exemplary question library according to an embodiment.

Question libraries according to embodiments utilize a mapping to a semantic data model. The mapping is between spans of text in the question and the entity that is present in the query. For a given topic and a list of questions, the list of entities used within the questions can be defined by the mapping.

For example, within the HR domain, entities used for mapping between questions and the data model can include but are not limited to:

Employee (with corresponding personal details),
Employment Start Date,
Employment End Date,
Seniority,
Salary,
Bonus, and
Resignation Reason.

In order to be able to make use of the question library, the data set is mapped to a comprehensive list of entities within a given topic. This could involve uploading a data set, and choosing which column corresponds to which entity in the semantic data model.

Not all entities of the model would need to be mapped. Consider a situation with 20 entities within a library topic that allows the user to answer 100 questions.

However, a user has only 15 of those entities in their data set. Under these circumstances, the system would show a subset of the 100 questions in the library that can be answered using the known 15 entities.

Embodiments may seek to accomplish objectives such as facilitating navigation utilizing a natural language interface, and augmenting the existing questions with additional qualifiers for increased flexibility. Examples of such modifiers can include:

"Who in the sales team is at risk of resignation?", or
"Who is at risk of resignation this year?".

The first question shows filtering results according to department (sales team). The second question shows filtering results according to the time period (this year) of the underlying predictive model.

A detailed workflow is now described. First, a numerical representation of textual data of a currently posed question is generated.

As previously mentioned, embodiments may involve a natural language interface where the user enters their query in a free-form text field. In order to match text, at least two approaches are possible.

A first approach compares text similarity by looking at edit distances (the number of characters that differ between two strings) between the raw inputs or preprocessed inputs. Certain preprocessing steps may include: discarding stop words (such as 'the'), lemmatizing the words to get to their base forms, and/or extracting influential words from the inputs.

A second approach generates text embeddings from the raw inputs. The text embeddings are numerical representations of text with semantic knowledge embedded.

Embeddings can be at different levels, such as words, sentences, or documents. Regardless of the embedding level, pieces of text with similar meanings have embeddings lying close to one another within the corresponding embedding space. Thus, comparing embeddings within the embedding space provides a way to assess semantic similarity between two textual inputs.

The second approach is able to address different word orderings and synonyms. For example, the questions:

"Who is at risk of resignation?", and
"Which employees are likely to quit?", have the same answer, even though they do not share a single word in common.

The current example adopts the second approach, and specifically employs a neural network which takes an arbitrary length text (words, sentences, or paragraphs) and encodes the input into a fixed-length numeric vector.

In this particular example, the Universal Sentence Encoder neural network architecture is employed for this purpose. However, embodiments are not limited to this or any other particular approach for encoding text into a numeric representation.

Here, the Universal Sentence Encoder generates a numeric vector of length 512, for an input text of arbitrary length. The Universal Sentence Encoder generates the numeric vector using a neural network trained on a variety of semantic similarity tasks. This neural network is used to encode both the input user query, and the existing questions in the question library.

As an example, the 512-dimensional embedding vector for the question:

"Who are my top sales people?",
appears as: [−0.0249, 0.0568, −0.0374, 0.0065, −0.0394, . . . , 0.0431].

The numbers in the embedding vector represent the weight of the input text across different indices. In a simplified sense, each index represents a meaning and numeric weight of the input text at that index captures the closeness of its association with and to that meaning. In this manner, the semantics of the word are embedded across the indices of the vector.

The following table presents a highly simplified representation of one example of (word-level) embeddings.

|  | Index #1 "Animal" | Index #2 "Domesticated" | Index #3 "Pet" | Index #4 "Fluffy" |
| --- | --- | --- | --- | --- |
| Dog | 0.8 | 0.91 | 0.94 | 0.79 |
| Rat | 0.78 | 0.10 | 0.34 | 0.12 |
| Lion | 0.83 | 0.15 | 0.21 | 0.84 |
| Monkey | 0.84 | 0.70 | 0.17 | 0.69 |
| Water | 0.02 | 0.01 | 0.04 | 0.07 |

In this example, the word "Dog" is represented with the embedding [0.8, 0.91, 0.94, 0.79]. The relatively high weight of the embedding vector for each index, indicates that dogs possess most of the qualities the embedding indices represent. By contrast, the embedding of the word "Rat" has lower magnitudes for the indices representing "domesticated", "pet", and "fluffy".

The above represents an extremely simplified example, and number of indices of the embeddings is much higher in practice (e.g., generally on the order of hundreds or thousands). This is because a substantial volume of additional information is available but is not being captured here.

Next, this exemplary workflow compares the input question with existing questions. Specifically, once the user query is represented numerically, it is ready to be semantically compared to existing questions present within the library.

This comparison may be accomplished by computing the similarity between text embeddings using vector similarity metrics. One approach for similarity comparison is to utilize Pearson's correlation coefficient.

In particular, Pearson's correlation evaluates the linear relationship between two variables. A relationship is linear when a change in one variable is associated with a proportional change in the other variable.

Assume that a hypothetical text embedding is represented as [0.1, 0.2, 0.3, 0.4]. The embedding with the values [0.2, 0.4, 0.6, 0.8] is linearly correlated with the first embedding, since each value is multiplied by a constant factor. Here, Pearson's correlation would attain its maximum value which is 1.

However, comparison approaches other than Pearson's correlation are possible. Some examples can include the use of non-parametric rank correlation coefficients.

Non-parametric rank correlation coefficients evaluate the monotonic relationship between two variables. In a monotonic relationship, the variables tend to change together (but not necessarily at a constant rate).

Consider, for example, the embeddings [0.1, 0.2, 0.3, 0.4] and [0.2, 0.4, 0.6, 1.0]. These have a rank correlation of 1, since the rank order of the elements of the embedding is the same ($4^{th}$ element>$3^{rd}$ element>$2^{nd}$ element>$1^{st}$ element).

In short, rank correlation coefficients look at the order of the elements in an array, and not their absolute values. For the instant (question library) environment, this can be interpreted as follows.

Recall that each index of the embedding, roughly corresponds to a concept or a property of the entity described by a piece of text. By examining the rank order of these dimensions, characteristics such as:

"more round than triangular", or
"more living than inanimate", can be characterized, rather than exactly quantifying the degree of the entity possessing a certain property.

Specific types of non-parametric rank correlation coefficients that may be referenced, include Spearman's rho, or Kendall's tau. Here, the instant example uses Spearman's rho in order to compare text embeddings—which results in a value between 0 and 1. Higher values show higher similarity between the inputs.

The similarity between:
"Who are my top sales people?", and
"Who are my best sales representatives?",
is found to be 0.78 using Spearman's rho. This result indicates that the above two sentences are strongly similar in meaning.

Once similarity between embedding vectors of the user query and the existing library questions has been determined, the library question with the highest similarity is selected as the matching question. Such selection may be subject to a threshold, to prevent irrelevant questions from being returned by the system.

The following is an example of a matched question, without resort to adding modifiers (see further discussion immediately below).

User's question: "Who made the highest sales?"
Corresponding question from the library: "Who is our top sales representative?"
Corresponding query (in the SQLite query language, but not limited to that language):
SELECT SalesPerson, SUM(SalesAmount) as TotalSales
FROM SalesTable
GROUP BY SalesPerson
ORDER BY TotalSales DESC
LIMIT 1;

As mentioned above, certain embodiments may apply extra modifiers to a question. In particular, a caveat with using text embeddings is that extra modifiers in the question may result in relatively little change to the resulting numeric vector.

For example, assume that the user issues the query:
"Who are my best sales representatives this year?".

Similarity between this and the library question ("Who is our top sales representative?") using the method described above, is 0.75. This indicates that adding the extra modifier "this year", affected the similarity by only 0.03.

However showing the result for: •"Who are my top sales people?" for this input query, may not result in a correct response. This is because the user is not interested in the overall sales performance, but only in the current year's performance. The addition of modifiers as described herein can aid in fine tuning the response of the system.

According to embodiments, at least two types of extra modifiers may be added. A first modifier type may have discrete named values such as:

"Who are my top sales people for Product X?"

A second modifier type may comprise time modifiers, such as:

"Who are my top sales people for the last two years?"

Embodiments may handle the two types of modifiers separately. For modifiers of the first type (with discrete named values), the user's data is first parsed, and then an inverted index is generated for fast lookups.

Consider the following highly simplified example to illustrate how an inverted index helps with this process:
Document #1: "hello world"
Document #2: "world peace".

An inverted index is a mapping from unique terms in the inputs, to the document id. For this example, the inverted index could appear as:
"hello": Document #1
"world": Document #1 and Document #2
"peace": Document #2.

Once this inverted index is generated, checking for documents containing a given word is relatively straightforward. That task can be accomplished as a lookup from this inverted index, without parsing all of the individual documents (which may be lengthy).

Such an approach helps rapidly locate the matching portions of a user's data, since this index is prebuilt and saved for convenience. Specific embodiments may employ the Lucene text search engine available from the Apache Software Foundation, for this task.

Time-specific modifiers of the second type, may be handled differently. This is because a variety of time formats are available.

For example, sales transactions may be listed in a spreadsheet with each sale tagged with a date in the format "DD.MM.YYYY". However, a user's question may include the phrase "for the last two years". Thus, there will be no data points matching this user input verbatim.

Accordingly, embodiments may parse this temporal expression, converting it into a canonical form which in turn is turned into a database query. Certain embodiments may use a hybrid system which employs rules and machine learning to extract such expressions in order to achieve this goal.

To accommodate differences attributable to typographical errors, particular embodiments may perform fuzzy matching, not restricting returned results to exact matches.

Once these two types of modifiers and the corresponding entities are extracted from the input question, they are compared to the entities in the matched question.

The database query is then formed, by removing, replacing, or adding entities to the database query corresponding to the found question. The result is then shown to the user.

The following is an example of a matched question, with resort to adding an extra time modifier.

User's question: Who made the highest sales last week?
Corresponding question from the library: Who is our top sales representative?
Corresponding SQLite query, with the modification over the original query shown in bold:
SELECT SalesPerson, SUM(SalesAMount) as TotalSales
FROM SalesTable WHERE SalesDate>DATE('now', '−7 days')
GROUP BY SalesPerson
ORDER BY TotalSales DESC
LIMIT 1;

In order to afford additional details regarding this modification aspect, three possible use cases of question modification are now presented. A first use case involves adding entities to an existing question.

This first use case assumes that an existing question in the library reads: • "Who are my top sales people?". The user issues the query: • "Who are my top sales people in North America?".

Referencing the inverted index, embodiments can check the model entities upon which that the predefined question is based. This checking can determine that "North America" is a member of "Location" dimension.

The existing question does not include any filters on this dimension. So, this location filter is added to the database query corresponding to the matched question.

Consider now a second use case that replaces (rather than adds) entities in an existing question. Here, assume that user issues the query:

"Who are my top sales people in Europe and Asia?".

The question library already includes the following existing question:

"Who are my top sales people in North America?".

Referencing the inverted index can determine that there is a location filter. But, the value of that location filter ("North America") in the library question, is different from the currently posed question.

Accordingly, embodiments can now drop the existing filter ("North America"), replacing it instead with the entities mentioned by the user ("Europe" and "Asia").

A third use case involves removing entities of an existing question. Here, assume that the user issues the query:

"Who are my top sales people?".

An existing question in the library reads:

"Who are my top sales people in North America?"

The inverted index reveals that there is no location filter mentioned in the posed question, even though the library question has one. In this case, the location filter is dropped in order to more closely align the question posed by the user, with the matched question that is stored in the library.

To afford flexibility users may be allowed to specify those entities which if overwritten, then the resulting question is interpreted as something different and not just a variation on the matched one. This can be specified when the user defines a question in the question library.

Specifically, according to certain embodiments the system can present the user with a list of entities in the question. The user can mark the entities that should not be overwritten when this question is retrieved.

Once the query result to the user's instant question is returned, the natural ordering in the question library may be leveraged to suggest a next question to the user, to reach a deeper level of detail.

For example, after the question:

"Who are my top sales people?", the question library might offer as the next question:

"What is the breakdown of my top sales people by location?".

In this manner, the inherent hierarchical structure (e.g., according to topic/business process area) of the question library, helps to assist the user with further analytical exploration.

While the above example has been described in connection with comparing text similarity by calculating vector similarity metrics, other approaches are possible. For example, text similarity may alternatively be compared by examining edit distances between raw and/or preprocessed inputs.

In such alternative embodiments, edit distances can represent a number of characters that differ between two strings. Such an approach may involve preprocessing steps including but not limited to:

discarding stop words such as 'the';
lemmatizing the words to obtain their base forms; and/or
extracting influential words from the inputs.

Embodiments may offer certain benefits over conventional analytic techniques. One possible advantage is flexibility. Specifically, users will be able to seamlessly switch between the following approaches:

utilizing the question library to enrich and elaborate upon questions previously posed, and
posing ad hoc new questions, which may not be addressed with any of the existing questions of the current question library.

Embodiments thus retain the flexibility of ad hoc natural language question answering systems, while also helping users to further structure their analyses. For example, the user's first question may not necessarily be related to any of the questions in the existing library. According to embodiments, however, this would be answered by parsing the user's question and extracting the data entity names within it.

A second question issued by the user may perfectly/partially match a library question. In that case, the user's question could be answered starting from the corresponding answer in the question library, and then potentially fine tuning that library answer.

Then, at this point the user may choose to navigate and follow through with the rest of the analysis in the library. Or, the user may ask ad hoc, follow-up questions depending upon their intuition and/or the objectives of the data analysis being conducted. Embodiments thus combine the benefits of a structured analysis template, with an ad hoc question answering system.

Returning to FIG. 1, there the particular embodiment is depicted with the engine responsible for implementing the question library, being located outside of the database storing the question library. However, this is not required.

Rather, alternative embodiments could leverage the processing power of an in-memory database engine (e.g., the in-memory database engine of the HANA in-memory database available from SAP SE), in order to perform various functions. Such functions can include but are not limited to:

generating a numerical representation of a text question;
assessing a similarity;
parsing a text question;
extracting a question element;
generating a modified query according to an extracted element.

Figure 4:
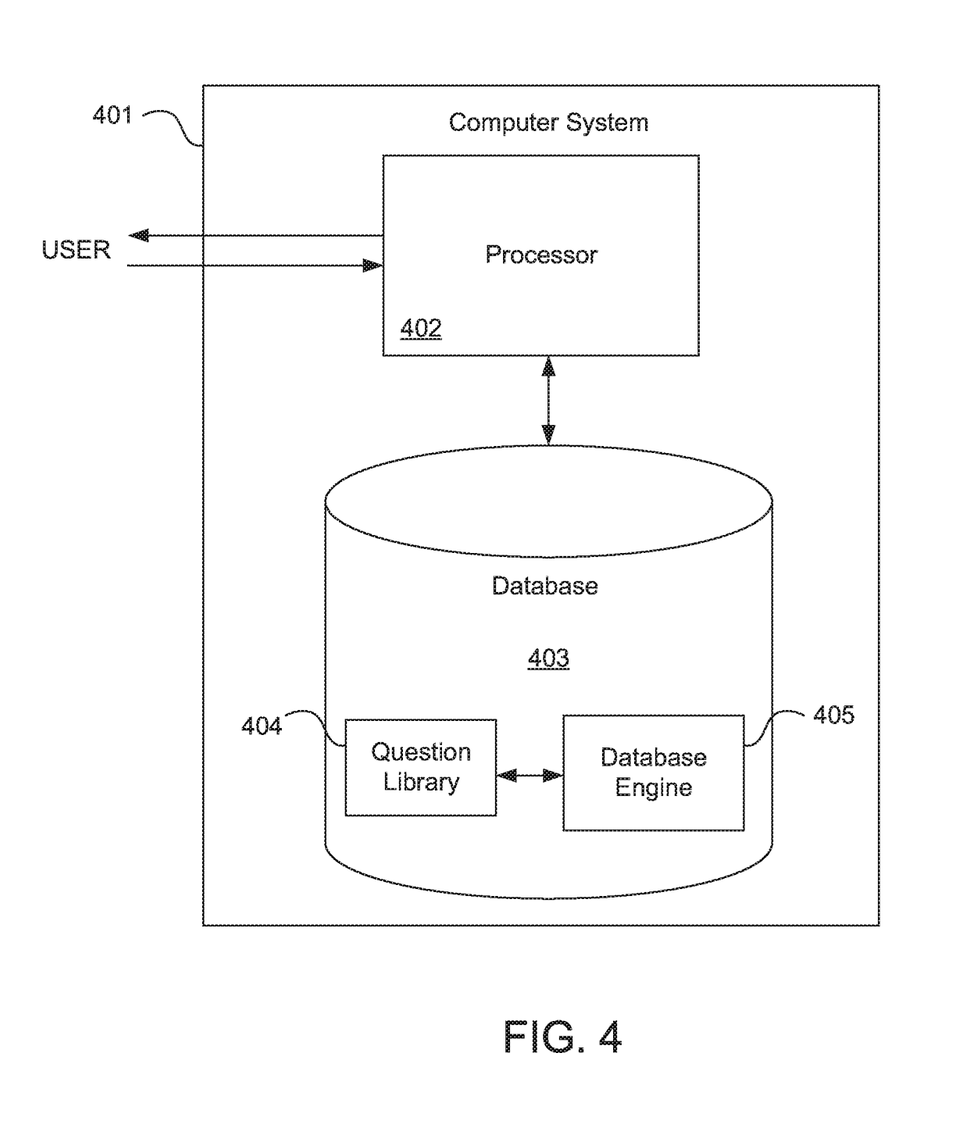
FIG. 4 illustrates hardware of a special purpose computing machine according to an embodiment that is configured to implement a question library.

Thus FIG. 4 illustrates hardware of a special purpose computing machine configured to implement a question library according to an embodiment. In particular, computer system 401 comprises a processor 402 that is in electronic communication with a non-transitory computer-readable storage medium comprising a database 403. This computer-readable storage medium has stored thereon code 405 corresponding to a database engine. Code 404 corresponds to a question library. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
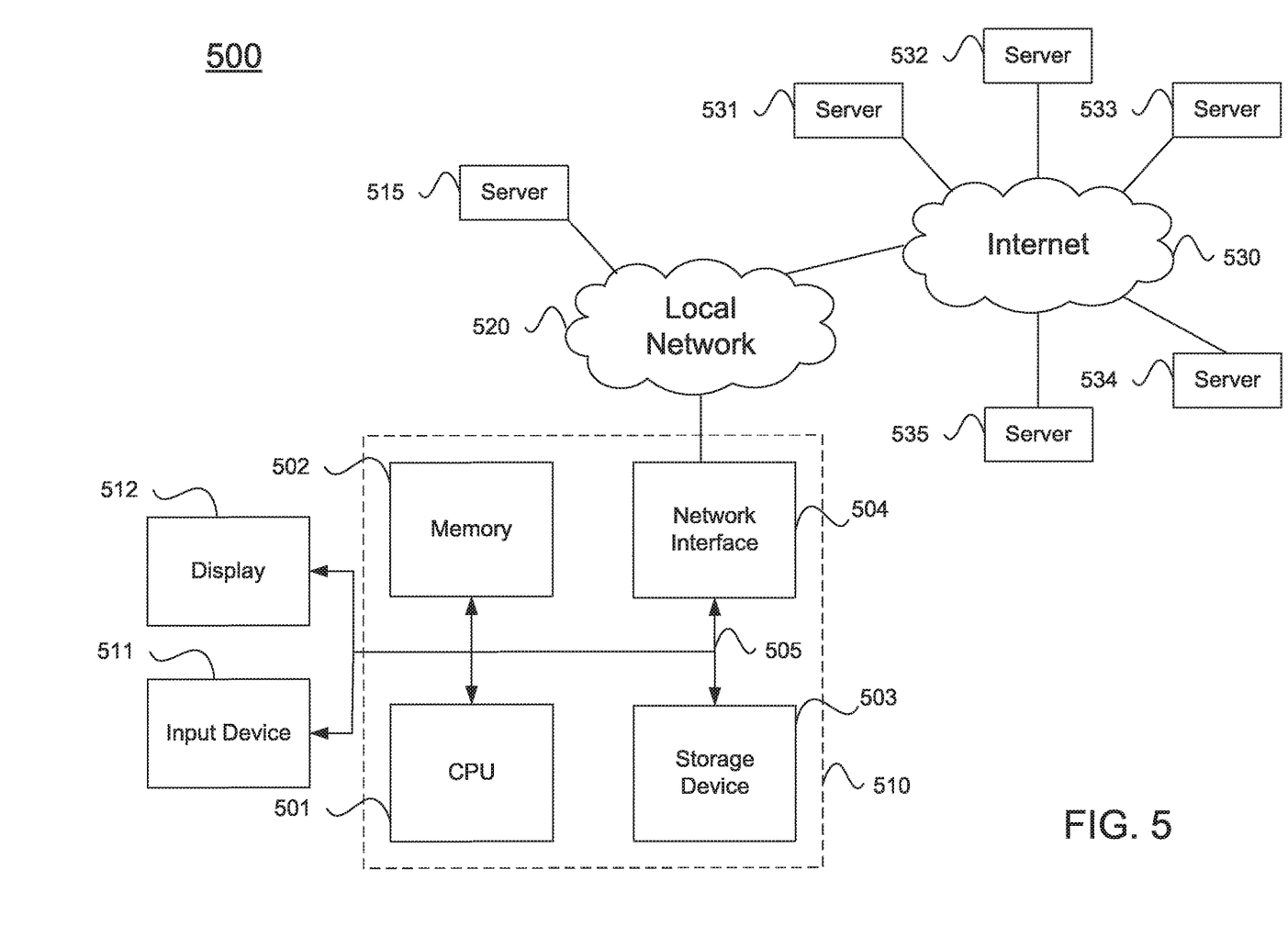
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a first text question;
converting the first text question to a first vector;
referencing a second text question stored in a question library associated with a second vector and having a first hierarchy including a topic and an entity;
referencing a mapping between a data model and the second text question to generate a similarity metric between the first vector and the second vector, the data model having a second hierarchy including the entity;
modifying a second query from another query stored in the question library associated with the second text question and the second vector, by,
parsing the first question according to a first expression comprising a discrete named value and a second expression comprising a temporal expression,
generating an inverted index from the first expression,
referencing the inverted index to change a filter in the another query, and
applying machine learning to the second expression such that the first expression is not overwritten in the second query based upon a prior input to mark the first expression in the question library; and
communicating the second query based on the second question for execution upon a data set stored in a database and organized according to the data model.

2. A method as in claim 1 wherein the second query is stored in the question library associated with the second text question and the second vector.

3. A method as in claim 1 wherein the similarity metric comprises a correlation coefficient.

4. A method as in claim 3 wherein the correlation coefficient comprises a non-parametric rank correlation coefficient.

5. A method as in claim 4 wherein the non-parametric rank correlation coefficient comprises Spearman's rho.

6. A method as in claim 1 wherein:
the database comprises an in-memory database;
the question library is stored in the in-memory database; and
the engine comprises an in-memory database engine of the in-memory database.

7. A non-transitory computer readable storage medium embodying a computer program for performing a method, said method comprising:
receiving a first text question;
converting the first text question to a first vector;
referencing a second text question stored in a question library associated with a second vector and having a first hierarchy including a topic and an entity;
referencing a mapping between a data model and the second text question to generate a similarity metric between the first vector and the second vector;
communicating a second query based upon the second text question, for execution upon a data set stored in a database and organized according to the data model, the data model having a second hierarchy including the entity, wherein the second query is modified from another query stored in the question library associated with the second text question and the second vector, by, parsing the first question according to a first expression comprising a discrete named value and a second expression comprising a temporal expression, generating an inverted index from the first expression, referencing the inverted index to change a filter in the another query, and applying machine learning to the second expression such that the first expression is not overwritten in the second query based upon a prior input to mark the first expression in the question library.

8. A non-transitory computer readable storage medium as in claim 7 wherein the similarity metric comprises a correlation coefficient.

9. A non-transitory computer readable storage medium as in claim 8 wherein the correlation coefficient comprises a non-parametric rank correlation coefficient.

10. A non-transitory computer readable storage medium as in claim 9 wherein the non-parametric rank correlation coefficient comprises Spearman's rho.

11. A computer system comprising:

one or more processors;

a software program, executable on said computer system, the software program configured to cause an in-memory database engine of an in-memory source database to:

receive a first text question;

convert the first text question to a first vector;

reference a second text question stored in a question library associated with a second vector and having a first hierarchy including a topic and an entity;

reference a mapping between a data model and the second text question to generate a similarity metric between the first vector and the second vector, the data model having a second hierarchy including the entity;

modify a second query from another query stored in the question library associated with the second text question and the second vector, by, parsing the first question according to a first expression comprising a discrete named value and a second expression comprising a temporal expression, generating an inverted index from the first expression, referencing the inverted index to change a filter in the another query, and applying machine learning to the second expression such that the first expression is not overwritten in the second query based upon a prior input to mark the first expression in the question library; and communicate the second query based on the second question for execution upon a data set stored in the in-memory database and organized according to the data model.

12. A computer system as in claim 11 wherein the second query is stored in the question library associated with the second text question and the second vector.

13. A computer system as in claim 12 wherein the in-memory database engine is further configured to modify the second query from another query stored in the question library associated with the second text question and the second vector.

14. A computer system as in claim 11 wherein the in-memory database engine is further configured to generate the similarity metric by calculating a correlation coefficient.

15. A computer system as in claim 11 wherein the data model is also stored in the in-memory database.

16. A computer system as in claim 11 wherein the mapping is also stored in the in-memory database.

* * * * *